US012745113B2

(12) United States Patent
Maemoto et al.

(10) Patent No.: US 12,745,113 B2
(45) Date of Patent: Sep. 22, 2026

(54) COMMUNICATION APPARATUS, MASTER NODE, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventors: Daiki Maemoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 18/392,436

(22) Filed: Dec. 21, 2023

(65) Prior Publication Data

US 2024/0129768 A1 Apr. 18, 2024

Related U.S. Application Data

(63) Continuation of application No. PCT/JP2022/025661, filed on Jun. 28, 2022.

(30) Foreign Application Priority Data

Jun. 29, 2021 (JP) ................................ 2021-107737

(51) Int. Cl.
*H04J 1/16* (2006.01)
*H04W 24/08* (2009.01)

(52) U.S. Cl.
CPC .................................. *H04W 24/08* (2013.01)

(58) Field of Classification Search
CPC ..... H04W 24/08; H04W 76/19; H04W 76/15; H04W 72/04; H04B 7/0695
(Continued)

(56) References Cited

U.S. PATENT DOCUMENTS 12,149,317 B2 * 11/2024 Svedman ............. H04W 72/23
2021/0013951 A1 * 1/2021 Chen .................... H04W 76/19
(Continued)

FOREIGN PATENT DOCUMENTS

WO WO-2020088565 A1 5/2020

OTHER PUBLICATIONS

R2-2106023, Efficient SCG (de)activation, Ericsson, dated May 19-27, 2021, pp. 1-10.
(Continued)

*Primary Examiner* — Chuong T Ho
(74) *Attorney, Agent, or Firm* — Harness, Dickey & Pierce, P.L.C.

(57) ABSTRACT

A user equipment is connected to a master node associated with a master cell group and connected to a secondary node associated with a secondary cell group by utilizing a dual connectivity scheme. The UE comprises: a communicator (120) configured to receive an RRC (radio resource control) message including information instructing deactivation of the secondary cell group; and a controller configured to deactivate the secondary cell group according to the information. The controller is configured to determine whether or not a cell in which beam failure is detected is a primary cell belonging to the deactivated secondary cell group, and the communicator (120) is configured to transmit an SCGFailureInformation message related to failure of the secondary cell group to the master node when the controller determines that the cell is the primary cell.

4 Claims, 10 Drawing Sheets

(58) Field of Classification Search
USPC .......................................................... 370/242
See application file for complete search history.

(56) References Cited

U.S. PATENT DOCUMENTS

| | | | | |
|---|---|---|---|---|
| 2022/0329371 | A1* | 10/2022 | Awoniyi-Oteri | H04L 5/0032 |
| 2022/0394583 | A1* | 12/2022 | Deenoo | H04W 76/20 |
| 2023/0189039 | A1* | 6/2023 | Turtinen | H04W 16/28 370/328 |
| 2023/0337020 | A1* | 10/2023 | Da Silva | H04B 7/088 |
| 2023/0371109 | A1* | 11/2023 | Jang | H04W 76/15 |
| 2024/0090054 | A1* | 3/2024 | Harada | H04W 52/028 |
| 2024/0147332 | A1* | 5/2024 | Zhang | H04W 36/04 |
| 2024/0205763 | A1* | 6/2024 | Yan | H04W 36/08 |
| 2024/0259076 | A1* | 8/2024 | Turtinen | H04B 7/06964 |
| 2024/0430796 | A1* | 12/2024 | Harada | H04W 76/36 |

OTHER PUBLICATIONS

R2-2105829, UE behaviour in deactivated SCG, Lenovo, May 19-27, 2021, pp. 1-4.
R2-2105064, Mobility for deactivated SCG, NTTDOCOMO Inc., May 19-27, 2021, pp. 1-4.
R2-2103808, UE measurements and reporting in deactivated SCG, Ericsson, Apr. 12-Apr. 20, 2021, pp. 1-10.
R2-2103893, UE measurements and reporting in deactivated SCG, Qualcomm, Apr. 12-Apr. 20, 2021, pp. 1-9.
R2-2103807, SCG deactivation procedures, Ericsson, Apr. 12-20, 2021, pp. 1-10.
R2-2104316, Summary of AI 8.2.2.2: UE measurements and reporting in deactivated SCG, Oppo, Apr. 12-Apr. 20, 2021, pp. 1-7.
R2-2103979, SCG activation, Huawei, HiSilicon, Apr. 12-Apr. 20, 2021, pp. 1-6.
R2-2103977, SCG deactivation, Huawei, HiSilicon, Apr. 4-12, 2021, pp. 1-2.
R2-2104315, Summary of AI 8.2.2.1: Deactivation of SCG, Huawei, HiSilicon, Apr. 4-12, 2021, pp. 1-5.
RP-201040, Revised WID on Further Multi-RAT Dual-Connectivity enhancements, Huawei, Jun. 29-Jul. 3, 2020, pp. 1-4.
3GPP TS 38.331 V16.0.0, NR; Radio Resource Control (RRC) protocol specification (Release 16), (Mar. 2020), pp. 1-835.
3GPP TS 38.323 V16.0.0, NR; Packet Data Convergence Protocol (PDCP) specification (Release 16), (Mar. 2020), pp. 1-37.
3GPP TS 38.321 V16.5.0, NR; Medium Access Control (MAC) protocol specification (Release 16), (Jun. 2021), pp. 1-157.
3GPP TS 38.300 V16.0.0, NR; NR and NG-RAN Overall Description; Stage 2 (Release 16), (Dec. 2019), pp. 1-101.
3GPP TS 38.213 V16.0.0, NR; Physical layer procedures for control (Release 16), (Dec. 2019), pp. 1-146.
3GPP TS 38.133 V16.0.0 NR; Requirements for support of radio resource management (Release 16), (Jun. 2019), pp. 1-16.
3GPP TS 37.340 V16.5.0, Evolved Universal Terrestrial Radio Access (E-UTRA) and NR; Multi-connectivity; Stage 2 (Release 16), (Mar. 2021), pp. 1-84.
OPPO, "UE Measurements and Reporting in Deactivated SCG", Document R2-2102897, 3GPP TSG-RAN Meeting #113bis-e, Apr. 12-20, 2021.
OPPO, "UE Measurements and Reporting in Deactivated SCG", Document R2-2104942 (revision of R2-2102897), 3GPP TSG-RAN WG2 Meeting #114-e, May 19-27, 2021.

* cited by examiner

FIG. 2

100
UE
NAS
RRC
PDCP
RLC
MAC
PHY

200
BASE STATION
RRC
PDCP
RLC
MAC
PHY

300
CORE NETWORK APPARATUS
NAS

FIG. 3

250A PSCell
250B SCell
200-2
BASE STATION
BEAM #2
BEAM #1
BEAM #0
BEAM FAILURE
UE
100

FIG. 5

100
UE
130
CONTROLLER
120
COMMUNICATOR
121
RECEIVER
122
TRANSMITTER
110

FIG. 6

200
BASE STATION
210
220
RADIO COMMUNICATOR
221
RECEIVER
222
TRANSMITTER
230
CONTROLLER
240
NETWORK COMMUNICATOR

Figure 7:
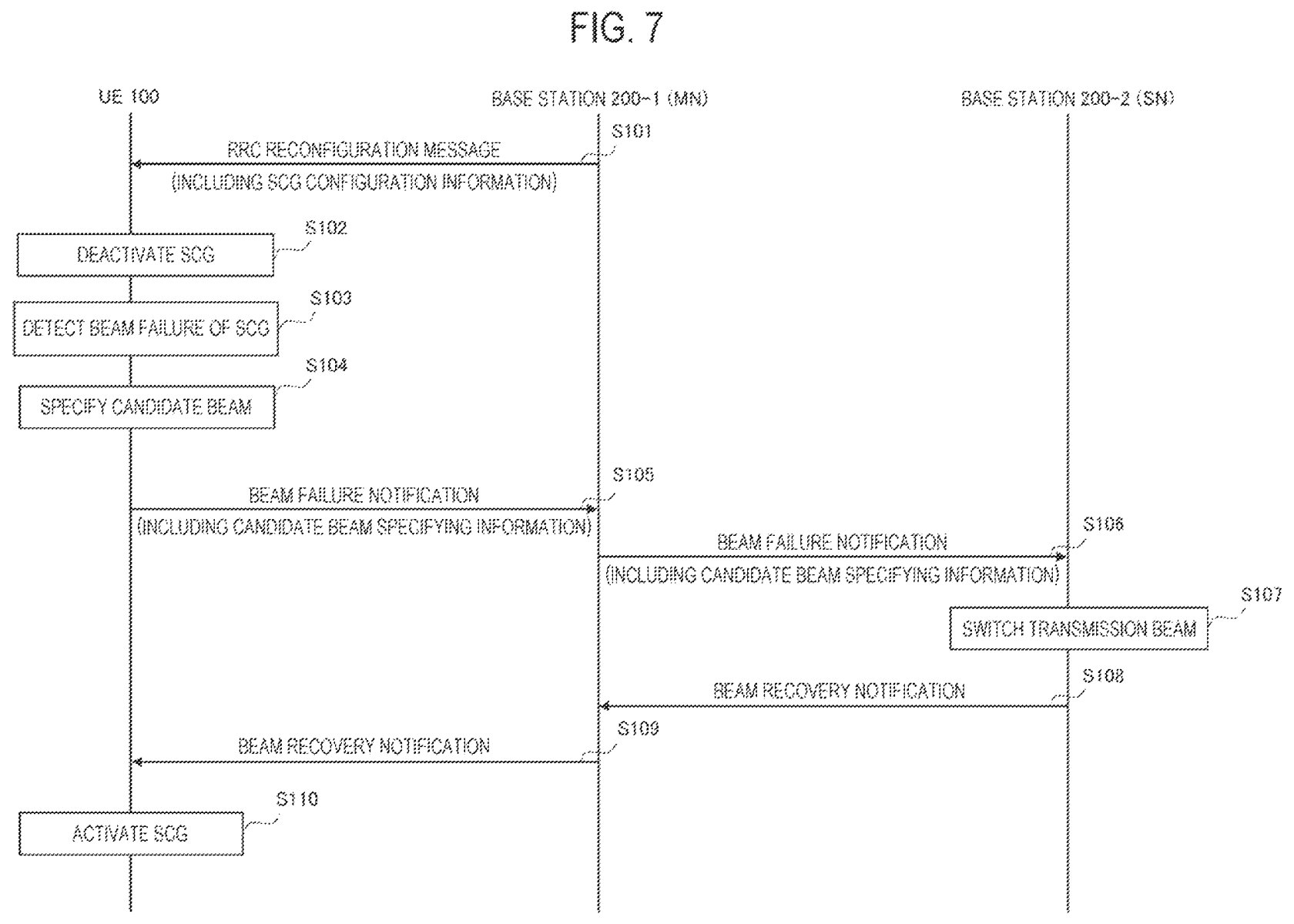

BASE STATION 200-1 (MN)

BASE STATION 200-2 (SN)

S101

RRC RECONFIGURATION MESSAGE
(INCLUDING SCG CONFIGURATION INFORMATION)

S102

DEACTIVATE SCG

S103

DETECT BEAM FAILURE OF SCG

S104

SPECIFY CANDIDATE BEAM

S105

BEAM FAILURE NOTIFICATION
(INCLUDING CANDIDATE BEAM SPECIFYING INFORMATION)

S106

BEAM FAILURE NOTIFICATION
(INCLUDING CANDIDATE BEAM SPECIFYING INFORMATION)

S107

SWITCH TRANSMISSION BEAM

S108

BEAM RECOVERY NOTIFICATION

S109

BEAM RECOVERY NOTIFICATION

S110

ACTIVATE SCG

FIG. 8

***SCGFailureInformation* message**

```
-- ASN1START
-- TAG-SCGFAILUREINFORMATION-START
SCGFailureInformation ::=                  SEQUENCE {
    criticalExtensions                         CHOICE {
        scgFailureInformation                      SCGFailureInformation-IEs,
        criticalExtensionsFuture                   SEQUENCE {}
    }
}
SCGFailureInformation-IEs ::=             SEQUENCE {
    failureReportSCG                          FailureReportSCG                  OPTIONAL,
    nonCriticalExtension                      SCGFailureInformation-v1590-IEs   OPTIONAL
}
SCGFailureInformation-v1590-IEs ::=       SEQUENCE {
    lateNonCriticalExtension                  OCTET STRING                      OPTIONAL,
    nonCriticalExtension                      SEQUENCE {}                       OPTIONAL
}
FailureReportSCG ::=                       SEQUENCE {
    failureType                                    ENUMERATED {
                                                       t310-Expiry, randomAccessProblem,
                                                       rlc-MaxNumRetx,
                                                       synchReconfigFailureSCG, scg-ReconfigFailure,
                                                       srb3-IntegrityFailure, other-r16, spare1},
    measResultFreqList                          MeasResultFreqList                                  OPTIONAL,
    measResultSCG-Failure                      OCTET STRING (CONTAINING MeasResultSCG-Failure)          OPTIONAL,
    ...,
    [[
    locationInfo-r16                            LocationInfo-r16            OPTIONAL,
    failureType-v1610                      ENUMERATED {scg-lbtFailure-r16, beamFailureRecoveryFailure-r16,
                                                t312-Expiry-r16, bh-RLF-r16, beamFailureDeactivatedSCG-r17,
                                                spare3, spare2, spare1} OPTIONAL
    ]],
    [[
    beamFailureDeactivatedSCG-InfoList-r17    SEQUENCE (SIZE (1..maxNrofServingCells)) OF BeamFailureDeactivatedSCG-Info-r17
    OPTIONAL
    ]]
}
MeasResultFreqList ::=                     SEQUENCE (SIZE (1..maxFreq)) OF MeasResult2NR
BeamFailureDeactivatedSCG-Info-r17 ::=         SEQUENCE {
    servCellIndex-r17                              ServCellIndex,
    bwp-Id-r17                                     BWP-Id,
    candidateBeamRS-Id-r17                         INTEGER (1..maxNrofCandidateBeams-r16)
}
```

| *SCGFailureInformation field descriptions* |
| --- |
| ***beamFailureDeactivatedSCG-InfoList***<br>The field contains the beam failure information detected on each serving cells (PSCell and SCell(s)) in the deactivated SCG. |

| *BeamFailureDeactivatedSCG-Info field descriptions* |
| --- |
| ***bwp-Id***<br>The ID of the DL BWP in the serving cell where beam failure is detected. |
| ***candidateBeamRS-Id***<br>If the serving cell where beam failure is detected is PSCell, this field indicates the index of an SSB with SS-RSRP above *rsrp-ThresholdSSB* amongst the SSBs in *candidateBeamRSList* or to the index of a CSI-RS with CSI-RSRP above *rsrp-ThresholdSSB* amongst the CSI-RSs in *candidateBeamRSList*. If the serving cell where beam failure is detected is SCell, this field indicates the index of an SSB with SS-RSRP above *rsrp-ThresholdBFR* amongst the SSBs in *candidateBeamRSSCellList* or to the index of a CSI-RS with CSI-RSRP above *rsrp-ThresholdBFR* amongst the CSI-RSs in *candidateBeamRSSCellList*. Index of an SSB or CSI-RS is the index of an entry in *candidateBeamRSList* or *candidateBeamRSSCellList* corresponding to the SSB or CSI-RS. Index 0 corresponds to the first entry in the *candidateBeamRSList* or the *candidateBeamRSSCellList*, index 1 corresponds to the second entry in the list and so on. |
| ***servCellIndex***<br>The ID of the serving cell in the deactivated SCG where beam failure is detected. |

COMMUNICATION APPARATUS, MASTER NODE, AND COMMUNICATION CONTROL METHOD

CROSS-REFERENCE TO RELATED APPLICATIONS

The present application is a continuation application of international Patent Application No. PCT/JP2022/025661, filed on Jun. 28, 2022, which designated the U.S., and claims the benefit of priority of Japanese Patent Application No. 2021-107737, filed on Jun. 29, 2021, the entire contents of which are incorporated herein by reference.

TECHNICAL FIELD

The present disclosure relates to a communication apparatus, a master node, and a communication control method used in a mobile communication system.

BACKGROUND ART

In the fifth generation (5G) mobile communication system (5G system), a dual connectivity scheme (what is called Dual Connectivity) in which a communication apparatus can use radio resources provided by a master node that manages a master cell group (MCG) and a secondary node that manages a secondary cell group (SCG) is specified (for example, refer to Non Patent Literature 1).

When detecting beam failure in a cell belonging to the SCG, a communication apparatus provides the secondary node with information necessary for performing beam failure recovery via signaling with the secondary node. As a result, the communication apparatus can recover from the beam failure (for example, refer to Non Patent Literature 2).

In recent years, in 3GPP (Third Generation Partnership Project) (registered trademark, the same in the following), which is a mobile communication system standardization project, deactivation of the SCG has been studied in order to reduce the power consumption of the communication apparatus (for example, refer to Non Patent Literature 3). In addition, detection of beam failure in a deactivated SCG has been studied (for example, refer to Non Patent Literature 4).

CITATION LIST

Non Patent Literature

Non Patent Literature 1: 3GPP Technical specification TS 37.340 V16.5.0

Non Patent Literature 2: 3GPP Technical specification TS 38.321 V16.5.0

Non Patent Literature 3: 3GPP Contribution RP-201040

Non Patent Literature 4: 3GPP Contribution R2-2103808

SUMMARY OF INVENTION

In a case where the SCG is deactivated, when detecting the beam failure in the SCG, the communication apparatus cannot perform signaling between the communication apparatus and the secondary node, and thus cannot provide information necessary for performing the beam failure recovery to the network side, and cannot recover from the beam failure.

Therefore, an object of the present disclosure is to provide a communication apparatus, a master node, and a communication control method capable of providing information necessary for performing beam failure recovery to a network side even in a case where an SCG is deactivated.

A communication apparatus according to a first feature is connected to a master node (200-1) associated with a master cell group and connected to a secondary node (200-2) associated with a secondary cell group by utilizing a dual connectivity scheme. The communication apparatus (100) comprises: a communicator (120) configured to receive an RRC (radio resource control) message including information instructing deactivation of the secondary cell group; and a controller (110) configured to deactivate the secondary cell group according to the information. The controller (110) is configured to determine whether or not a cell in which beam failure is detected is a primary cell belonging to the deactivated secondary cell group, and the communicator (120) is configured to transmit an SCGFailureInformation message related to failure of the secondary cell group to the master node (200-1) when the controller (110) determines that the cell is the primary cell.

A master node according to a second feature connects to a communication apparatus together with a secondary node associated with a secondary cell group by utilizing a dual connectivity scheme. The master node comprises: a transmitter configured to transmit an RRC message including information instructing deactivation of the secondary cell group to the communication apparatus; and a receiver configured to receive an SCGFailureInformation message related to failure of the secondary cell group from the communication apparatus in a case where the secondary cell group is deactivated. The SCGFailureInformation message is transmitted from the communication apparatus when beam failure is detected in a primary cell belonging to the deactivated secondary cell group.

A communication control method according to a third feature is performed in a communication apparatus connected to a master node associated with a master cell group and connected to a secondary node associated with a secondary cell group by utilizing a dual connectivity scheme. The communication control method comprises the steps of: receiving an RRC (radio resource control) message including information instructing deactivation of the secondary cell group; deactivating the secondary cell group according to the information; determining whether or not a cell in which beam failure is detected is a primary cell belonging to the deactivated secondary cell group; and transmitting an SCGFailureInformation message related to a failure of the secondary cell group to the master node (200-1) when the cell is determined to be the primary cell.

BRIEF DESCRIPTION OF DRAWINGS

The foregoing and other objects, features, and advantages of the present disclosure will become more apparent from the following detailed description with reference to the accompanying drawings. The drawings include the following:

FIG. 2 is a diagram illustrating a configuration example of a protocol stack in the mobile communication system according to the embodiment.

FIG. 3 is a diagram illustrating an operation example when beam failure is detected in a secondary cell (SCell) in an SCG.

FIG. 5 is a diagram illustrating a configuration of a UE according to the embodiment.

FIG. 6 is a diagram illustrating a configuration of a base station according to the embodiment.

FIG. 7 is a diagram illustrating an operation example of the mobile communication system according to the embodiment.

FIG. 8 is a diagram illustrating an example of information included in an SCGFailureInformation message according to the embodiment.

FIG. 9 is a diagram illustrating an example of information included in the SCGFailureInformation message according to the embodiment.

DESCRIPTION OF EMBODIMENTS

Figure 1:
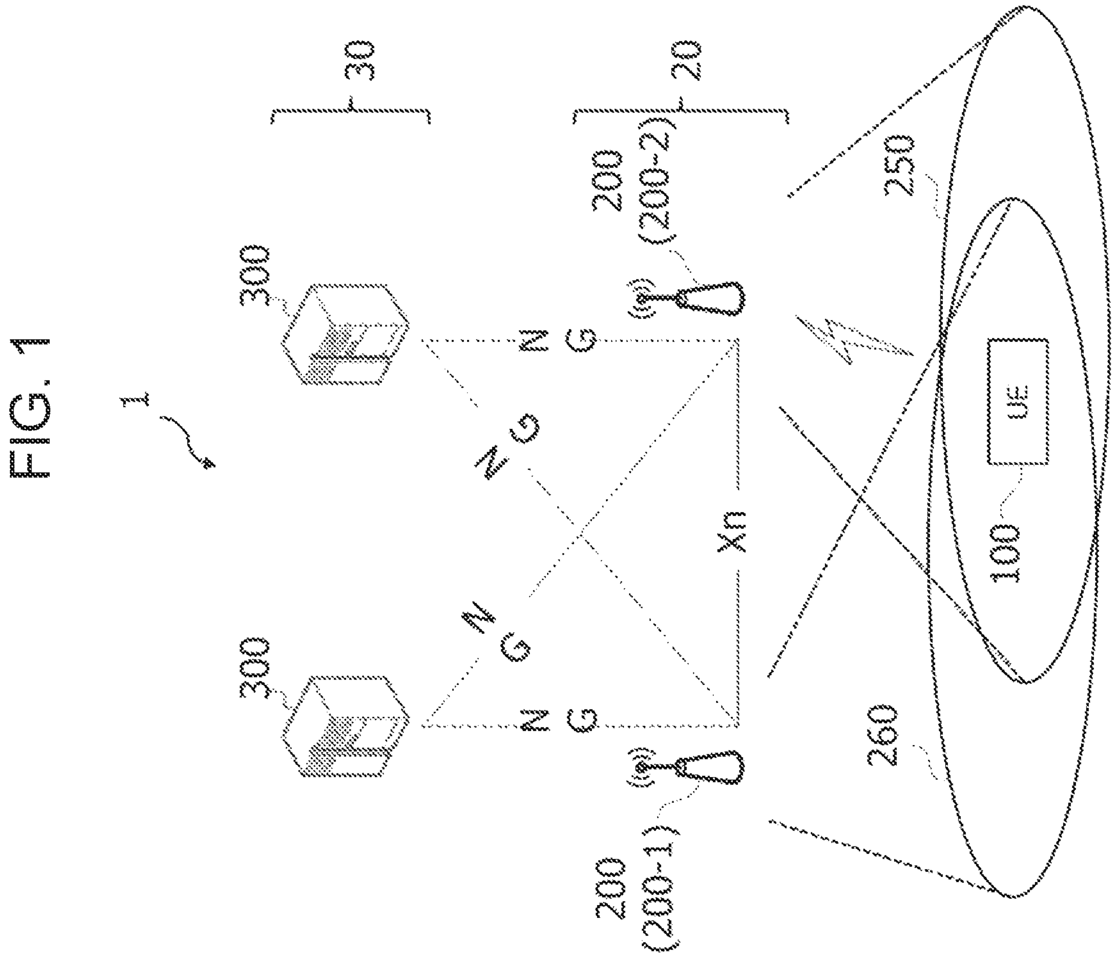
FIG. 1 is a diagram illustrating a configuration of a mobile communication system according to an embodiment.

Hereinafter, embodiments of the present disclosure will be described in detail with reference to the accompanying drawings. Note that, in the present specification and the drawings, elements that can be described in a similar manner are denoted by the same or similar reference numerals, and redundant description can be omitted.

(Mobile Communication System)

An example of a configuration of a mobile communication system 1 according to an embodiment of the present disclosure will be described with reference to FIG. 1. The mobile communication system 1 is, for example, a mobile communication system conforming to the technical specification (Technical Specification: TS) of 3GPP, which is a mobile communication system standardization project. Hereinafter, as the mobile communication system 1, a description will be given, as an example, as to the fifth generation system (5th generation system: 5GS) of the 3GPP standard, that is, a mobile communication system based on NR (New Radio).

As illustrated in FIG. 1, the mobile communication system 1 includes a 5G radio access network (what is called Next Generation Radio Access Network: NG-RAN) 20, a 5G core network (5G Core Network: 5GC) 30, and a communication apparatus (User Equipment: UE) 100.

The NG-RAN 20 includes a base station 200 that is a node of the radio access network. The base station 200 is a radio communication apparatus that performs radio communication with the UE 100. The base station 200 manages one or a plurality of cells. The base station 200 performs radio communication with the UE 100 that has established a connection with its cell in a radio resource control (RRC) layer. The base station 200 has a radio resource management (RRM) function, a user data (hereinafter, simply referred to as "data") routing function, a measurement control function for mobility control and scheduling, and/or the like. The "cell" is used as a term indicating a minimum unit of a radio communication area. The "cell" is also used as a term indicating a function or a resource that performs radio communication with the UE 100. One cell belongs to one carrier frequency. FIG. 1 illustrates an example in which a base station 200-1 manages a cell 260 and a base station 200-2 manages a cell 250. The UE 100 is located in the overlapping region of the cell 260 and the cell 250.

The base station 200 is, for example, a gNB that provides protocol terminations of an NR user plane and a control plane toward the UE 100 and is connected to the 5GC 30 via an NG interface. Note that the base station 200 may be, for example, an eNB that provides protocol terminations of an E-UTRA (Evolved Universal Terrestrial Radio Access) user plane and a control plane towards the UE 100 in LTE (Long Term Evolution).

The 5GC 30 includes a core network apparatus 300. The core network apparatus 300 is an apparatus corresponding to a control plane and may be an apparatus that performs various mobility management for the UE 100. The core network apparatus 300 communicates with the UE 100 using NAS (Non-Access Stratum) signaling and manages information on a tracking area in which the UE 100 exists. The core network apparatus 300 performs paging through the base station 200 in order to notify the UE 100 of an incoming call. The core network apparatus 300 may be an AMF (Access and Mobility Management Function) of 5G/NR or an MME (Mobility Management Entity) of 4G/LTE.

The 5GC 30 includes the core network apparatus 300. The core network apparatus 300 includes, for example, the AMF (Access and Mobility Management Function) and/or a UPF (User Plane Function). The AMF performs mobility management of the UE 100. The UPF provides a function specialized for user plane processing. The AMF and the UPF are connected to the base station 200 via the NG interface.

The UE 100 is only required to be any apparatus used by the user. The UE 100 is, for example, a mobile radio communication apparatus such as a mobile phone terminal such as a smartphone, a tablet terminal, a notebook PC, a communication module, or a communication card. Furthermore, the UE 100 may be a vehicle (for example, a car, a train, or the like) or an apparatus provided in a vehicle. The UE 100 may be a transport body other than a vehicle (for example, a ship, an airplane, or the like) or an apparatus provided in the transport body other than a vehicle. Furthermore, the UE 100 may be a sensor or an apparatus provided in a sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

(Configuration Example of Protocol Stack)

Figure 2:
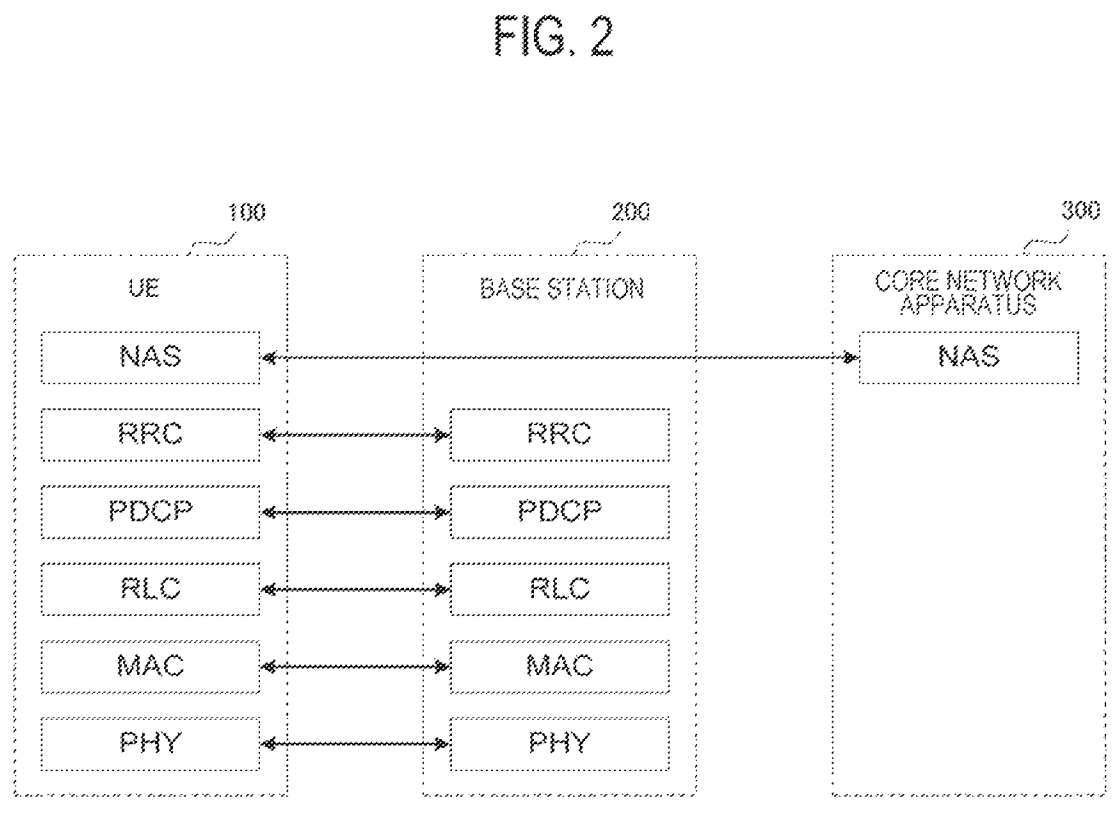

Next, a configuration example of a protocol stack in the mobile communication system 1 according to the embodiment will be described with reference to FIG. 2.

A protocol of a radio section between the UE 100 and the base station 200 includes a physical (PHY) layer, a MAC (Medium Access Control) layer, an RLC (Radio Link Control) layer, a PDCP (Packet Data Convergence Protocol) layer, and an RRC (Radio Resource Control) layer.

The PHY layer performs encoding/decoding, modulation/demodulation, antenna mapping/demapping, and resource mapping/demapping. Data and control information are transmitted, via a physical channel, between the PHY layer of the UE 100 and the PHY layer of the base station 200.

The physical channel includes a plurality of OFDM (Orthogonal Frequency Division Multiplexing) symbols in the time domain and a plurality of subcarriers in the frequency domain. One subframe includes a plurality of OFDM symbols in the time domain. A resource block is a resource allocation unit, and includes a plurality of OFDM symbols and a plurality of subcarriers. A frame can be composed of 10 ms, and can include 10 subframes composed of 1 ms. A number of slots corresponding to the subcarrier spacing may be included in the subframe.

Among the physical channels, a physical downlink control channel (PDCCH) plays a central role for purposes such as, for example, downlink scheduling assignment, uplink scheduling grant, and transmission power control.

In the NR, the UE 100 can use a bandwidth narrower than a system bandwidth (that is, the bandwidth of the cell). The base station 200 configures, in the UE 100, a bandwidth part (BWP) including consecutive PRBs (Physical Resource Block). The UE 100 transmits and receives data and a control signal in the active BWP. In the UE 100, for example, a maximum of four BWPs can be configured for one cell. The BWPs may have different subcarrier spacings or may have frequencies overlapping each other. In a case where a plurality of BWPs is configured for the UE 100, the base station 200 can designate which BWP is to be activated by control in the downlink. As a result, the base station 200 can dynamically adjust the UE bandwidth according to the amount of data traffic of the UE 100 and the like, and can reduce the UE power consumption.

The MAC layer performs priority control of data, a retransmission process by hybrid ARQ (HARQ: Hybrid Automatic Repeat reQuest), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size, modulation and coding scheme (MCS)) and allocated resources to the UE 100. The control information transmitted between the MAC layer of the UE 100 and the MAC layer of the base station 200 may be referred to as a MAC CE (Control Element).

The RLC layer transmits data to the RLC layer on the reception side using the functions of the MAC layer and the PHY layer. Data and control information are transmitted, via a logical channel, between the RLC layer of the UE 100 and the RLC layer of the base station 200.

The PDCP layer performs header compression/decompression and encryption/decryption.

An SDAP (Service Data Adaptation Protocol) layer may be provided as a higher layer of the PDCP layer. The SDAP (Service Data Adaptation Protocol) layer performs mapping between an IP flow, which is a unit in which a core network performs QoS control, and a radio bearer, which is a unit in which an AS (Access Stratum) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200 (that is, the RRC connection has been established), the UE 100 is in an RRC connected state. In a case where there is no RRC connection between the RRC of the UE 100 and the RRC of the base station 200 (that is, the RRC connection has not established), the UE 100 is in an RRC idle state. In a case where the RRC connection between the RRC of the UE 100 and the RRC of the base station 200 is suspended, the UE 100 is in an RRC inactive state.

A NAS layer located above the RRC layer performs session management and mobility management of the UE 100. NAS signaling is transmitted between the NAS layer of the UE 100 and the NAS layer of the core network apparatus 300.

Note that the UE 100 has an application layer and the like in addition to the protocol of the radio interface.

(Dual Connectivity Scheme)

In the dual connectivity scheme (what is called Dual Connectivity), the UE 100 in the RRC connected state is configured to utilize radio resources provided by two different base stations 200. These base stations 200 are connected via a non-ideal backhaul and have different schedulers for allocating the radio resources to the UE 100. One base station 200 operates as a master node that manages a master cell group (hereinafter, MCG), and the other base station 200 operates as a secondary node that manages an SCG (hereinafter, SCG). Therefore, the UE 100 can use radio resources provided from the master node and the secondary node.

The master node is a radio access node that provides a control plane connection to the core network 30. The master node may be referred to as a master eNB, a master ng-eNB, or a master gNB. The secondary node has no control plane connection to the core network 30 and provides additional radio resources to the UE 100. The secondary node may be referred to as an en-gNB, a secondary ng-eNB, or a secondary gNB. Here, the master node and/or the secondary node are logical entities (logical entity). In the present embodiment, the base station 200 may correspond to the master node and/or the secondary node. That is, the base station 200 may be replaced with the master node and/or the secondary node.

The MCG is a group of serving cells associated with the master node. The MCG includes a primary cell (PCell) and optionally one or more secondary cells (SCell). The SCG is a group of serving cells associated with the secondary node. The SCG includes a primary cell (PSCell) of the SCG and optionally one or more secondary cells (SCell). Note that one MAC entity for the MCG and one MAC entity for the SCG are configured in the UE 100.

(Outline of Beam Failure Detection and Recovery)

Next, an outline of beam failure detection and recovery will be described with reference to FIGS. 3 and 4.

The NR can perform broadband transmission in a high frequency band such as a millimeter wave band or a terahertz wave band as compared with LTE. In order to compensate for radio wave attenuation in the radio wave in such a high frequency band, the NR uses high directivity beamforming using a large number of antennas between the base station 200 and the UE 100 to obtain high beam gain. In the NR, a beam control technology for establishing and maintaining a beam pair between the base station 200 and the UE 100 is introduced. The beam failure detection and recovery technique is one of such beam control techniques.

For beam failure detection (BFD), the base station 200 configures a downlink reference signal resource for detecting beam failure in the UE 100. Such a reference signal resource is one of an SSB (SS: Synchronization Signal/PBCH Block) and a CSI-RS (Channel State Information Reference Signal). The SSB includes a primary synchronization signal (PSS), a secondary synchronization signal (SSS), a PBCH (Physical Broadcast Channel), and a demodulation reference signal (DMRS). For example, the SSB may be composed of four consecutive OFDM symbols in the time domain. In addition, the SSB may be composed of 240 consecutive subcarriers (that is, 20 resource blocks) in the frequency domain. The PBCH is a physical channel that carries a master information block (MIB). The CSI-RS is a reference signal that is transmitted for the UE 100 to measure a state of a radio channel.

Note that the SSB-based BFD is based on the SSB associated with an initial downlink BWP, and can be configured only for the downlink BWP including the initial downlink BWP and the SSB associated therewith. For another downlink BWP, the BFD is performed only on the basis of the CSI-RS.

In the UE 100, the MAC layer counts a beam failure event (beam failure instance indicator (BFI)) notified from the physical layer with a counter, and detects (declares) beam failure when the count value becomes greater than or equal to a specified number of times before the expiration of the timer.

Figure 3:
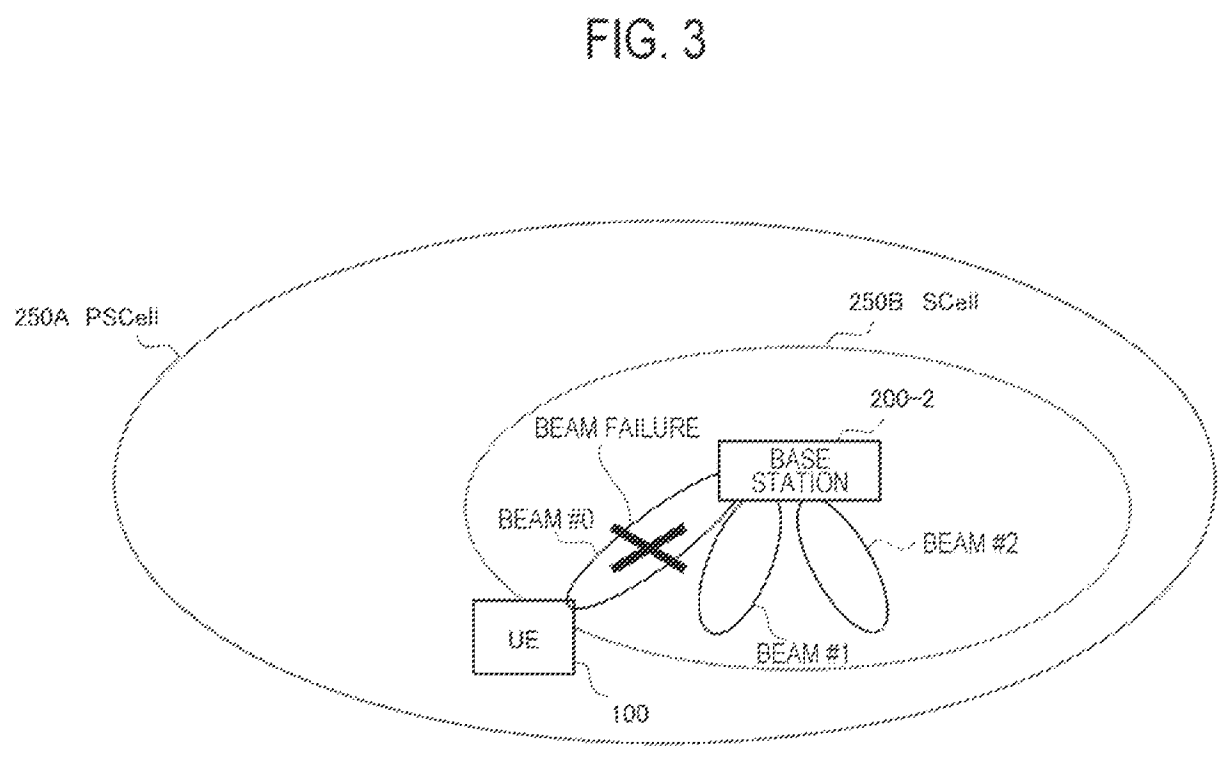

FIG. 3 illustrates an operation example in a case where beam failure is detected in the SCell in the SCG.

FIG. 3 illustrates an example in which the base station 200-2 operates as the secondary node and manages the cell 250 (SCell 250B), which is the SCell. The base station 200-2 forms a total of three beams of beams #0 to #2 in the SCell 250B. The UE 100 detects beam failure during communication using the beam #0 in the SCell 250B.

In this case, the UE 100 triggers beam failure recovery (BFR) by initiating transmission of a beam failure recovery MAC control element (BFR MAC CE). Here, the UE 100 selects a beam (for example, the beam #1) suitable for the SCell 250B, and indicates the selected beam information together with information regarding the beam failure by the BFR MAC CE. When the UE 100 receives the PDCCH indicating the uplink grant of new transmission of the HARQ process used for the transmission of the BFR MAC CE, the recovery of the SCell 250B from the beam failure is completed.

Figure 4:
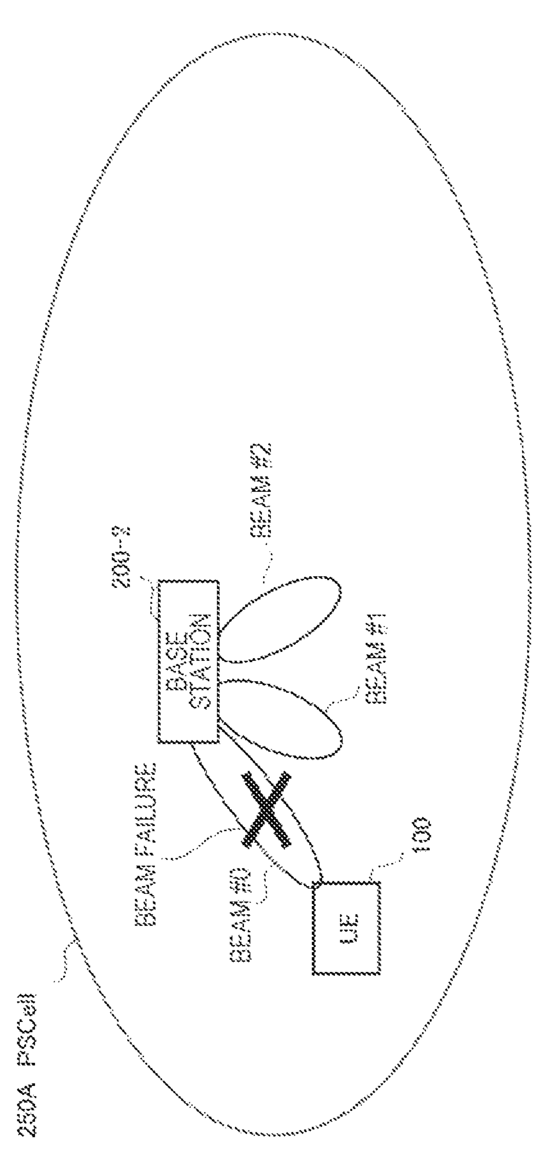
FIG. 4 is a diagram illustrating an operation example when beam failure is detected in a PSCell (primary secondary cell) in the SCG.

FIG. 4 illustrates an operation example in a case where beam failure is detected in the PSCell in the SCG.

FIG. 4 illustrates an example in which the base station 200-2 manages the cell 250 (PSCell 250A), which is the PSCell. The base station 200-2 forms a total of three beams of beams #0 to #2 in the PSCell 250A. The UE 100 detects beam failure during communication using the beam #0 in the PSCell 250A.

In this case, the UE 100 triggers the BFR by initiating a random access procedure for the PSCell 250A. Here, the UE 100 selects an appropriate beam (for example, the beam #1) for performing the BFR. When the random access procedure is completed, the BFR is completed.

(Deactivation of SCG)

Next, deactivation of the SCG will be described.

In 3GPP, deactivation of the SCG is studied in order to reduce the power consumption of the UE 100. When the SCG is deactivated, the UE 100 deactivates all the cells 250 (the PSCell and the SCell) belonging to the SCG. The UE 100 stops the transmission/reception operation in the deactivated cell 250, so that the power consumption of the UE 100 is reduced. Such transmission/reception operations are, for example, reporting of CSI (Channel Status Information), monitoring of the PDCCH, transmission of RACH (Random Access CHannel), transmission of SRS (Sounding Reference Signal), and/or transmission of UL-SCH (UL-Shared CHannel).

The UE 100 deactivates the SCG, for example, by any one of the following methods.

First method: The UE 100 deactivates the SCG in response to receiving an instruction to deactivate the SCG from the master node (the base station 200-1). The instruction is transmitted by any one of signaling of the RRC layer (RRC message), signaling of the MAC layer (MAC CE), and signaling of the PHY layer (PDCCH).

Second method: The UE 100 deactivates the SCG in response to the expiration of the timer for deactivating the SCG.

The UE 100 performs the above-described beam failure detection for each cell 250 belonging to the deactivated SCG. However, in a case where the SCG is deactivated, since the UE 100 does not perform the transmission/reception operation in each cell 250, the operation for triggering the BFR described above (performing the random access procedure, transmitting the BFR MAC CE) cannot be performed (is not performed). Therefore, in a case where the SCG is deactivated, the UE 100 cannot recover from the beam failure of the cell 250 (PSCell and/or SCell) belonging to the SCG. In the embodiment, even in a case where the SCG is deactivated, the UE 100 can recover from the beam failure of the cell 250 (PSCell and/or SCell) belonging to the SCG.

(Configuration of Communication Apparatus)

Figure 5:
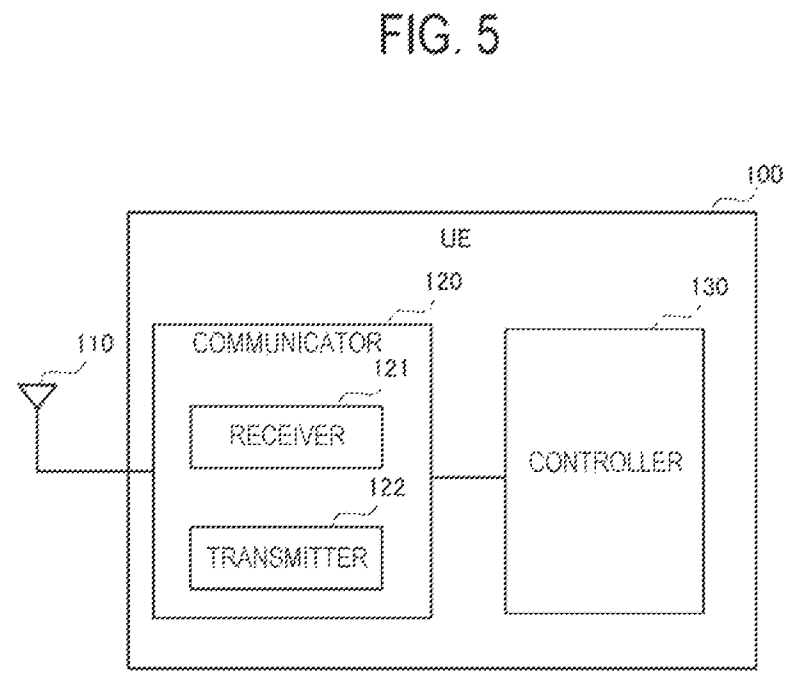

Next, a configuration example of the UE 100 according to the embodiment will be described with reference to FIG. 5. As illustrated in FIG. 5, the UE 100 includes an antenna 110, a communicator 120 and a controller 130.

The communicator 120 communicates with other communication apparatuses by transmitting and receiving signals via the antenna 110 under the control of the controller 130. For example, the communicator 120 receives a radio signal from the base station 200 and transmits a radio signal to the base station 200. Furthermore, for example, the communicator 120 may receive a radio signal from another UE and transmit a radio signal to another UE. Note that the antenna 110 may be provided outside the UE 100.

The communicator 120 includes a receiver 121 and a transmitter 122. The receiver 121 converts a radio signal received by the antenna 110 into a received signal that is a baseband signal, performs signal processing on the received signal, and outputs the received signal to the controller 130. The transmitter 122 performs signal processing on a transmission signal that is a baseband signal output by the controller 130, converts the transmission signal into a radio signal, and transmits the radio signal from the antenna 110.

Note that the receiver 121 may include one or a plurality of reception devices. The transmitter 122 may include one or a plurality of transmission devices. The reception device and the transmission device may be configured by one transceiver. In addition, the antenna 110 may be used for both reception and transmission.

The controller 130 performs various kinds of control in the UE 100. The controller 130 controls, for example, communication with the base station 200 or another UE 100 via the communicator 120. Operation of the UE 100 to be described later may be operation under the control of the controller 130.

The controller 130 may include one or more processors capable of executing a program and a memory that stores the program. The one or more processors may execute a program to perform the operation of the controller 130. The program may be a program for causing the processor to execute the operation of the controller 130.

The processor performs digital processing of signals to be transmitted and received via the antenna 110 and an RF circuit. The digital processing includes processing of the protocol stack of the RAN. The processor may be a single processor. The processor may include a plurality of processors. The plurality of processors may include a baseband processor that performs the digital processing and one or more processors that perform other processing. The memory stores a program to be executed by the processor, parameters related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), or a flash memory. All or part of the memory may be included in the processor.

In the UE 100 according to the embodiment, the controller 130 detects beam failure in the cell 250 belonging to the deactivated SCG and determines a candidate beam to be used for recovering from the beam failure. The communicator 120 transmits a failure notification including beam specifying information for specifying the determined candidate beam to the base station 200-1 operating as the master node. As a result, the network side (the base station 200-1 and the base station 200-2) can grasp the candidate beam determined by the UE 100, and can switch a transmission beam to the candidate beam in the SCG. Therefore, even in a case where the SCG is deactivated in the UE 100, the UE 100 can recover from the beam failure of the cell 250 (PSCell and/or SCell) belonging to the SCG.

Note that, hereinafter, the operation of functional units (specifically, the communicator 120 and the controller 130) included in the UE 100 may be described as the operation of the UE 100.

(Configuration of Base Station)

Figure 6:
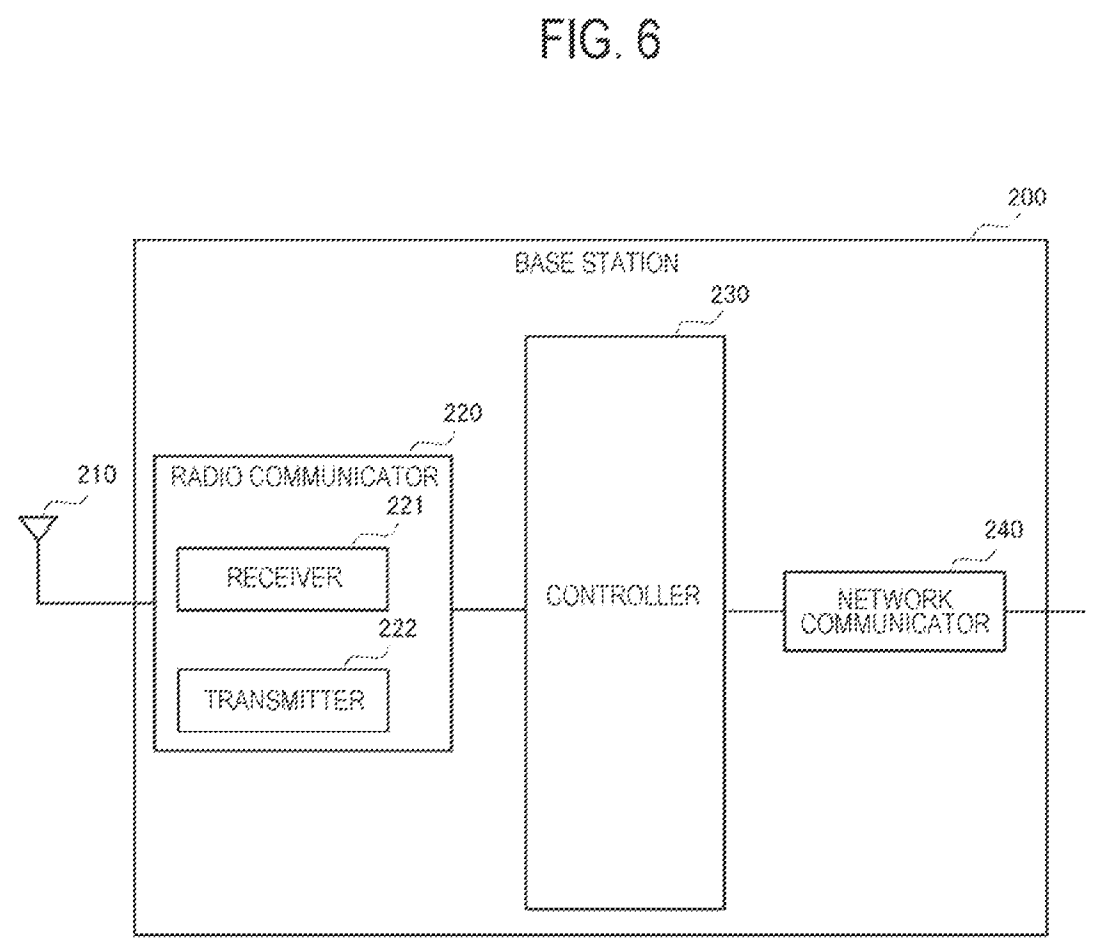

A configuration example of the base station 200 will be described with reference to FIG. 6. As illustrated in FIG. 4, the base station 200 includes an antenna 210, a radio communicator 220, a controller 230, and a network communicator 240.

The radio communicator 220 performs communication with the UE 100 via the antenna 210 under the control of the controller 230. The radio communicator 220 includes a receiver 221 and a transmitter 222. The receiver 221 converts a radio signal received by the antenna 210 into a received signal that is a baseband signal, performs signal processing on the received signal, and outputs the received signal to the controller 230. The transmitter 222 performs signal processing on a transmission signal that is a baseband signal output by the controller 230, converts the transmission signal into a radio signal, and transmits the radio signal from the antenna 210.

The network communicator 240 is connected to the core network apparatus 300. The network communicator 240 performs network communication with the core network apparatus 300 under the control of the controller 230.

The controller 230 controls the radio communicator 220 and performs various kinds of control in the base station 200. The controller 230 includes at least one processor and at least one memory. The memory stores a program executed by the processor and information used for processing by the processor. The memory may include at least one of a ROM, an EPROM, an EEPROM, a RAM, and a flash memory. The processor may include a digital signal processor (DSP) that performs digital processing on a digital signal and a central processing unit (CPU) that executes a program. Note that a part of the memory may be provided in the radio communicator 220. In addition, the DSP may be provided in the radio communicator 220.

In the base station 200-1 according to the embodiment, the radio communicator 220 receives a failure notification from the UE 100, the failure notification including beam specifying information specifying a candidate beam to be used for recovering from the beam failure in the cell 250 belonging to the deactivated secondary cell group. The network communicator 240 transmits the failure notification to the base station 200-2 operating as the secondary node. As a result, the base station 200-2 can grasp the beam specifying information for specifying the candidate beam determined by the UE 100, and can switch the transmission beam to the UE 100 to the candidate beam determined by the UE 100. Therefore, even in a case where the SCG is deactivated in the UE 100, the UE 100 can recover from the beam failure of the cell 250 (PSCell and/or SCell) belonging to the SCG.

Note that, hereinafter, the operation of the functional units (specifically, the radio communicator 220, the controller 230, and the network communicator 240) included in the base station 200 may be described as the operation of the base station 200.

(Operation Example)

Next, operation examples of the UE 100 and the base station 200 (the base station 200-1, the base station 200-2) according to the embodiment of the present disclosure will be described with reference to FIGS. 7 to 10.

In the operation examples, the base station 200-1 operates as a master node and the base station 200-2 operates as a secondary node. Hereinafter, the master node (the base station 200-1) and the secondary node (the base station 200-2) may be appropriately referred to as "networks".

As illustrated in FIG. 7, in step S101, the base station 200-1 (the radio communicator 220) transmits an RRC reconfiguration message including SCG configuration information to the UE 100. The UE 100 (the communicator 120) receives the RRC reconfiguration message including the SCG configuration information from the base station 200-1.

The SCG configuration information is information for configuring the radio resource of the SCG in the UE 100 or updating the radio resource of the SCG that has been already configured in the UE 100. The SCG configuration information includes various parameters for configuring the radio resources of the cell 250 for each cell 250 belonging to the SCG. The UE 100 (the controller 130) uses the radio resources of the SCG on the basis of the received various parameters. The content of the SCG configuration information is configured by the base station 200-2 operating as the secondary node.

The SCG configuration information includes configuration information (hereinafter, referred to as BFR configuration information) for performing the BFR in the cell 250 for each cell 250 belonging to the SCG. The BFR configuration information includes a BFR-RS list, which is a list for configuring a plurality of beam failure recovery reference signals (hereinafter, referred to as a BFR-RS), and information indicating a threshold (hereinafter, referred to as a BFR threshold) for determining a candidate beam to be used for performing the BFR. One BFR-RS is associated with one BFR beam. Each BFR-RS may be an SSB and/or a CSI-RS. The BFR-RS list includes an identifier of each BFR-RS. The BFR-RS list is provided for each downlink BWP belonging to the cell 250.

In a case where the cell 250 is a PSCell, the corresponding BFR-RS list may be referred to as "candidateBeamRSList", and the corresponding BFR threshold may be referred to as "rsrp-ThresholdSSB". In a case where the cell 250 is a SCell, the corresponding BRF-RS list may be referred to as "candidateBeamRSSCellList", and the corresponding BFR threshold may be referred to as "rsrp-ThresholdBFR".

The SCG configuration information includes configuration information (hereinafter, referred to as BFD configuration information) for performing detection of beam failure in the cell 250 for each cell 250 belonging to the SCG. The BFD configuration information includes information for configuring a reference signal resource (hereinafter, referred to as a BFD resource) for the beam failure detection, information for configuring a timer value of a timer (hereinafter, referred to as a BFD timer) for the beam failure detection, and information for configuring a count value (hereinafter, a BFD count value) for the beam failure detection. The BFD resource includes one or more reference signals for BFD. The reference signal for BFD is an SSB or a CSI-RS.

The SCG configuration information may further include SCG state information for configuring an initial state (activated state or deactivated state) of the SCG.

The SCG configuration information may further include information indicating a timer value of an SCG deactivation timer for deactivating the SCG.

In step S102, the UE 100 (the controller 130) deactivates the SCG. Specifically, the UE 100 (the controller 130) deactivates the SCG by any one of the following methods.

First method: The UE 100 (the controller 130) deactivates the SCG in response to receiving an instruction to deactivate the SCG from the base station 200-1. The instruction is transmitted by any one of signaling of the RRC layer (RRC message), signaling of the MAC layer (MAC CE), and signaling of the PHY layer (PDCCH).

Second method: The UE 100 (the controller 130) deactivates the SCG in response to the expiration of the SCG deactivation timer. Specifically, first, in step S101, in response to receiving the SCG configuration information, the UE 100 (the controller 130) activates the SCG deactivation timer at the same time as configuring the initial state of the SCG to be activated. The SCG configuration information includes SCG state information for configuring the initial state of the SCG to activation, and information indicating a timer value of the SCG deactivation timer. Second, in step S102, the UE 100 (the controller 130) deactivates the SCG in response to the expiration of the SCG deactivation timer.

In step S103, the UE 100 (the controller 130) detects beam failure of the SCG. The detection of the beam failure is performed in the following method.

First, the physical layer of the UE 100 evaluates the radio link quality of the BFD resource configured in a target BWP for each cell 250 belonging to the SCG. The radio link quality may be a block error rate (BLER) of the PDCCH and/or RSRP (Reference Signal Received Power). Note that the RSRP in the present disclosure may be read as Reference Signal Received Quality (RSRQ), Signal to Interference plus Noise Ratio (SINR), and/or other information regarding power or quality.

Here, the target BWP is a BWP that should be used by the UE 100 to detect beam failure in a case where the SCG is deactivated. The UE 100 may autonomously select any one of the plurality of configured downlink BWPs as the target BWP. For example, the UE 100 selects the BWP with the largest bandwidth as the target BWP. The UE 100 may select the active BWP immediately before the SCG is deactivated as the target BWP. The UE 100 may select the initial BWP as the target BWP. Alternatively, the base station 200-2 may designate the target BWP for the UE 100 by the SCG configuration information.

Second, when the radio link quality of all the reference signal resources in the BFD resource configured for the target BWP is worse than the threshold value, the physical layer of the UE 100 periodically outputs the beam failure instance indicator to the MAC layer of the UE 100. This period is configured to, for example, the larger one of the period of the minimum reference signal in the BFD resource and 2 ms. The physical layer may output the identifier of the BWP corresponding to the BFD resource and the identifier of the cell 250 together with the beam failure instance indicator.

Third, the MAC layer of the UE 100 detects beam failure on the basis of the beam failure instance indicator received from the physical layer. Specifically, the MAC layer manages the BFD timer and the BFD counter for each cell 250 belonging to the SCG. Then, upon receiving the beam failure instance indicator corresponding to the cell 250 from the physical layer, the MAC layer initiates the BFD timer corresponding to the cell 250 and increments (that is, one is added) the BFD counter corresponding to the cell 250. The MAC layer detects beam failure for the corresponding cell 250 when the count value of the BFD counter is greater than or equal to the configured BFD count value before the expiration of the BFD timer.

When detecting the beam failure, the MAC layer outputs, to the RRC layer, an indication (Indication) indicating that the beam failure is detected.

Note that, instead of the MAC layer, the RRC layer may detect the beam failure. In this case, the BFD timer and the BFD counter described above may be managed by the RRC layer instead of the MAC layer.

In step S104, the UE 100 (the controller 130) determines a candidate beam to be used for recovering from the beam failure. Specifically, first, the physical layer measures the RSRP of each BFR-RS in the BFR-RS list corresponding to a BWP in which BFD is detected. Second, the physical layer determines a beam corresponding to a BFR-RS on which the RSRP greater than or equal to the BFR threshold is measured as a candidate beam to be used for recovering from the beam failure.

The physical layer outputs the identifier of the determined candidate beam to the MAC layer. The physical layer may determine a plurality of candidate beams. In this case, the physical layer outputs the identifiers of the plurality of determined candidate beams to the MAC layer. Note that when the RRC layer performs the beam failure detection instead of the MAC layer, the physical layer outputs the identifier of the determined candidate beam to the RRC layer.

In step S105, the UE 100 (the communicator 120) transmits beam failure notification to the base station 200-1. The base station 200-1 (the radio communicator 220) receives the beam failure notification from the UE 100. The beam failure notification is a message, from the UE 100, for notifying the network of information regarding the beam failure detected in each cell 250 belonging to the deactivated SCG.

The beam failure notification includes, for each cell 250 in which the beam failure is detected, a cell identifier of the cell 250, a BWP identifier of a target BWP of the cell, and beam specifying information for specifying a candidate beam determined for recovering from the beam failure. Note that in a case where the SCG includes only the PSCell, the beam failure notification may not include the cell identifier. When only one downlink BWP is configured for the cell 250 in which the beam failure is detected, the beam failure notification may not include the BWP identifier. The beam specifying information is an identifier of a BFR-RS corresponding to the determined candidate beam.

The beam failure notification transmitted from the UE 100 to the base station 200-1 may be transmitted by an RRC message and/or a MAC CE. The RRC message is, for example, an SCGFailureInformation message.

A determination condition for the UE 100 to determine whether or not to transmit the beam failure notification may be configured in the UE 100 from the network. The determination condition is, for example, the following 1) or 2).

1) Beam failure in any one of the cells 250 (PSCell or SCell) belonging to the SCG has been detected, and a candidate beam for recovering from the beam failure has been determined.

2) The cell 250 in which the beam failure has been detected is the PSCell, and the candidate beam for recovering from the beam failure in the cell 250 has been determined. In this case, even if the beam failure is detected in the cell 250, which is not the PSCell, the UE 100 does not transmit the beam failure notification. If there is no beam failure in the PSCell, even if there is beam failure only in the SCell, the UE 100 can communicate with the secondary node (the base station 200-2) via the PSCell when the SCG is activated. Therefore, it is less necessary to notify the network of the beam failure of the SCell than the PSCell.

The determination condition is not limited to 1) or 2) described above. For example, the UE 100 may detect the beam failure in the SCG within a certain duration of time, and transmit the beam failure notification when the beam failure is detected in at least one cell 250 at a time point at which the certain duration ends. The determination condition may not be configured in the UE 100 from the network, and may be defined in advance by a technical specification. Note that in a case where the determination condition is not configured in the UE 100, the UE 100 may transmit the beam failure notification at any timing after the beam failure is detected.

Next, a specific example of the SCGFailureInformation message for transmitting the beam failure notification will be described with reference to FIGS. 8 and 9.

As illustrated in FIGS. 8 and 9, the SCGFailureInformation message includes a beam failure information element list (beamFailureDeactivatedSCG-InfoList-r17) 410 as the beam failure notification.

The beam failure information element list (beamFailureDeactivatedSCG-InfoList-r17) 410 includes up to maxNrofServingCells of beam failure information elements (BeamFailureDeactivatedSCG-Info-r17) 411.

Each beam failure information element (BeamFailureDeactivatedSCG-Info-r17) 411 includes a cell identifier (servCellIndex-r17) for identifying a cell 250 in which the beam failure corresponding to the beam failure information element 411 is detected, a BWP identifier (bwp-Id) for identifying a BWP in which the beam failure is detected, and beam specifying information (candidateBeamRS-Id) for specifying a candidate beam to be used for recovering from the beam failure.

Referring back to FIG. 7, in step S106, the base station 200-1 (the network communicator 240) transmits the beam failure notification received from the UE 100 to the base station 200-2. The base station 200-2 (the network communicator 240) receives the beam failure notification from the base station 200-1.

Figure 10:
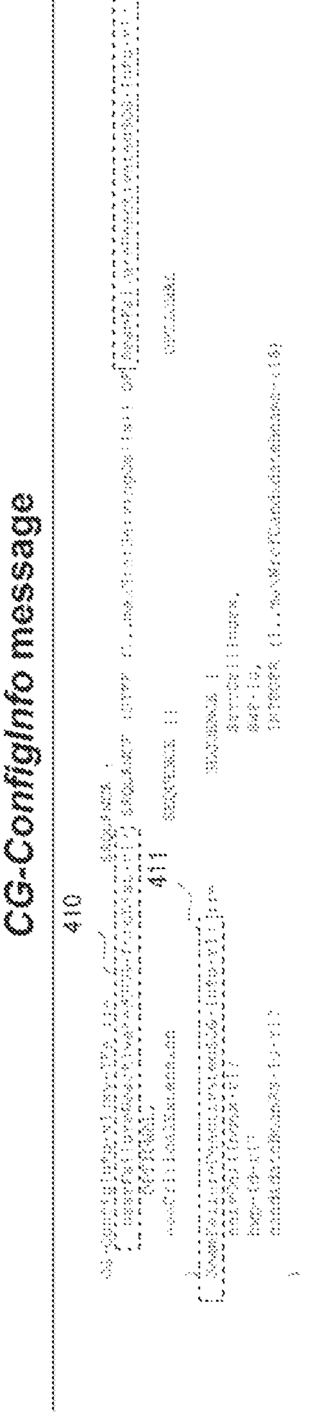
FIG. 10 is a diagram illustrating an example of information included in a CG-ConfigInfo message according to the embodiment.

The beam failure notification transmitted from the base station 200-1 to the base station 200-2 may be transmitted by a cell group configuration information (CG-ConfigInfo) message, for example, as illustrated in FIG. 10.

In step S107, the base station 200-2 (the controller 230) switches the transmission beam to the UE 100 to the candidate beam indicated in the beam failure notification. The "transmission beam to the UE 100" is a beam used by downlink transmission to the UE 100 in the cell 250 indicated in the failure notification when the SCG is activated. Such downlink transmission is, for example, transmission of the PDCCH.

When the beam failure notification indicates a plurality of candidate beams for one cell 250, the base station 200-2 (the controller 230) selects one candidate beam among the plurality of candidate beams and switches the transmission beam to the UE 100 to the selected candidate beam. For example, the base station 200-2 (the controller 230) may select a candidate beam in which the number of serving UEs 100 is small among the plurality of candidate beams.

In step S108, the base station 200-2 (the network communicator 240) transmits, to the base station 200-1, a beam recovery notification indicating that the transmission beam to the UE 100 has been switched to the candidate beam. The base station 200-1 (the network communicator 240) receives the beam recovery notification from the base station 200-2. When the base station 200-2 selects one candidate beam among the plurality of candidate beams, the base station 200-2 transmits the beam recovery notification including information specifying the selected candidate beam.

In step S109, the base station 200-1 transmits the beam recovery notification received from the base station 200-1 to the UE 100. The UE 100 receives the beam recovery notification from the base station 200-1. The beam recovery notification transmitted to the UE 100 is transmitted by the RRC message or the MAC CE. As a result, the UE 100 grasps the transmission beam to the UE 100 in the cell 250 in which the beam failure is detected.

In step S110, the UE 100 activates the SCG. The UE 100 activates the SCG, for example, in response to an instruction from the base station 200-1. Such an instruction is transmitted by any of the RRC message, the MAC CE, and the PDCCH. Thereafter, the UE 100 receives the downlink transmission (for example, PDCCH) from the base station 200-1 using the transmission beam grasped in step S109.

Other Embodiments

The operation sequence (and the operation flow) in the above-described embodiment may not necessarily be performed in chronological order according to the order described in the flow diagram or the sequence diagram. For example, the steps in the operation may be performed in an order different from the order described as the flow diagram or the sequence diagram, or may be performed in parallel. In addition, some of the steps in the operation may be removed and additional steps may be added to the processing. In addition, the operation sequence (and the operation flow) in the above-described embodiment may be performed separately and independently, or may be performed by combining two or more operation sequences (and operation flows). For example, some steps of one operation flow may be added to another operation flow, or some steps of one operation flow may be replaced with some steps of another operation flow.

In the above-described embodiments, the base station 200 may include a plurality of units. The plurality of units may include a first unit that hosts a higher layer (higher layer) included in the protocol stack and a second unit that hosts a lower layer (lower layer) included in the protocol stack. The higher layer may include the RRC layer, the SDAP layer, and the PDCP layer, and the lower layer may include the RLC layer, the MAC layer, and the PHY layer. The first unit may be a CU (central unit), and the second unit may be a DU (Distributed Unit). The plurality of units may include a third unit that performs processing of a lower layer of the PHY layer. The second unit may perform processing of a higher layer of the PHY layer. The third unit may be an RU (Radio Unit). The base station 200 may be one of the plurality of units, and may be connected to another unit of the plurality of units. In addition, the base station 200 may be an IAB (Integrated Access and Backhaul) donor or an IAB node.

In the above-described embodiments, a mobile communication system based on the NR is described as an example of the mobile communication system 1. However, the mobile communication system 1 is not limited to this example. The mobile communication system 1 may be a system conforming to a TS of any of LTE or another generation system (for example, sixth generation) of the 3GPP standard. The base station 200 may be an eNB providing protocol terminations of E-UTRA user plane and control plane toward the UE 100 in LTE. The mobile communication system 1 may be a system conforming to a TS defined in a standard other than the 3GPP standard.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a CD-ROM or a DVD-ROM. In addition, a circuit that executes each processing performed by the UE 100 or the base station 200 may be integrated, and at least a part of the UE 100 or the base station 200 may be configured as a semiconductor integrated circuit (chipset, SoC).

In the above-described embodiment, "transmit (transmit)" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive (receive)" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "acquire (obtain/acquire)" may mean to acquire information from stored information, may mean to acquire information from information received from another node, or may mean to acquire the information by generating information. Similarly, "include (include)" and "comprise (comprise)" do not mean to include only the listed items, but mean that the terms may include only the listed items or may include additional items in addition to the listed items. Similarly, in the present disclosure, "or (or)" does not mean exclusive OR but means OR.

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

The invention claimed is:

1. A communication apparatus configured to connect to a master node associated with a master cell group and connect to a secondary node associated with a secondary cell group, the communication apparatus comprising:

a receiver configured to receive a radio resource control (RRC) message including first information, second information and third information, the first information indicating deactivation of the secondary cell group, the second information indicating a downlink bandwidth part (BWP) to be used for beam failure detection in a case where the deactivation of the secondary cell group is indicated, the third information configuring a resource of a reference signal for the beam failure detection on the downlink BWP, a controller configured to perform the deactivation of the secondary cell group based on the first information, and perform the beam failure detection according to evaluation of the resource of the reference signal based on the second information and the third information, and a transmitter configured to transmit, based on detection of a beam failure of a primary secondary cell belonging to the deactivated secondary cell group, an SCGFailureInformation message for the beam failure of the primary secondary cell, wherein the controller includes a physical layer, a MAC (Medium Access Control) layer, and an RRC layer, the physical layer is configured to notify the MAC layer of a beam failure instance indicator based on the evaluation of the resource of the reference signal, and the MAC layer is configured to notify the RRC layer of the beam failure of the primary secondary cell based on the beam failure instance indicator and a counter value.

2. The communication apparatus according to claim 1, wherein the receiver is configured to receive information used for determining transmission of the SCGFailureInformation message, the transmitter is configured to transmit the SCGFailureInformation message based on the information used for determining transmission of the SCGFailureInformation message.

3. A communication method executed by a communication apparatus configured to connect to a master node associated with a master cell group and connect to a secondary node associated with a secondary cell group, the communication method comprising:

receiving a radio resource control (RRC) message including first information, second information and third information, the first information indicating deactivation of the secondary cell group, the second information indicating a downlink bandwidth part (BWP) to be used for beam failure detection in a case where the deactivation of the secondary cell group is indicated, the third information configuring a resource of a reference signal for the beam failure detection on the downlink BWP;

performing the deactivation of the secondary cell group based on the first information;

performing the beam failure detection according to evaluation of the resource of the reference signal based on the second information and the third information; and transmitting, based on detection of a beam failure of a primary secondary cell belonging to the deactivated secondary cell group, an SCGFailureInformation message for the beam failure of the primary secondary cell, wherein the communication apparatus includes a physical layer, a MAC (Medium Access Control) layer, and an RRC layer, the communication method further comprising:

notifying by the physical layer, the MAC layer of a beam failure instance indicator based on the evaluation of the resource of the reference signal; and notifying by the MAC layer, the RRC layer of the beam failure on a basis of the beam failure instance indicator and a value of a counter.

4. The communication method according to claim 3, further comprising:

receiving information used for determining transmission of the SCGFailureInformation message; and transmitting the SCGFailureInformation message based on the information used for determining transmission of the SCGFailureInformation message.

* * * * *